(12) United States Patent
Tanaka et al.

(10) Patent No.: US 12,320,970 B2
(45) Date of Patent: Jun. 3, 2025

(54) IMAGE FORMING APPARATUS COMPRISING A MOVABLE MIRROR AND OPERATION METHOD THEREOF

(71) Applicant: FUJIFILM Corporation, Tokyo (JP)

(72) Inventors: Nobuya Tanaka, Kanagawa (JP); Shinichiro Sonoda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 531 days.

(21) Appl. No.: 17/830,862

(22) Filed: Jun. 2, 2022

(65) Prior Publication Data

US 2022/0390739 A1 Dec. 8, 2022

(30) Foreign Application Priority Data

Jun. 8, 2021 (JP) ................. 2021-095860

(51) Int. Cl.
*G02B 26/08* (2006.01)
*G02B 26/10* (2006.01)
*H04N 9/31* (2006.01)

(52) U.S. Cl.
CPC ....... *G02B 26/0833* (2013.01); *H04N 9/3135* (2013.01); *H04N 9/3152* (2013.01); *G02B 26/105* (2013.01)

(58) Field of Classification Search
CPC .............................................. H04N 9/3135
See application file for complete search history.

(56) References Cited

U.S. PATENT DOCUMENTS

| 4,423,426 A | 12/1983 | Kitamura |
| 8,559,086 B2 | 10/2013 | Davis et al. |
| 2011/0261428 A1 | 10/2011 | Pinter et al. |

(Continued)

FOREIGN PATENT DOCUMENTS

| DE | 10 2008 043 416 A1 | 5/2010 |
| EP | 1 806 571 A1 | 7/2007 |

(Continued)

OTHER PUBLICATIONS

Japanese Office Action for Japanese Application No. 2021-095860, dated Oct. 1, 2024, with an English translation.

(Continued)

*Primary Examiner* — Paul C Lee
(74) *Attorney, Agent, or Firm* — Birch, Stewart, Kolasch & Birch, LLP

(57) ABSTRACT

An image forming apparatus includes a light emitting device that emits light, a movable mirror that reflects the light emitted from the light emitting device, a first actuator that causes the movable mirror to swing about a first axis, a first reference signal output portion that outputs a first reference signal by estimating a point in time when a deflection angle of the movable mirror about the first axis becomes equal to a first reference angle, a light emission controller that causes the light emitting device to emit the light based on the first reference signal output from the first reference signal output portion, an imaging apparatus that images the light reflected by the movable mirror, and a correction portion that corrects a timing of the first reference signal output by the first reference signal output portion based on imaging information acquired by the imaging apparatus.

6 Claims, 16 Drawing Sheets

(56) References Cited

U.S. PATENT DOCUMENTS

| | | | | |
|---|---|---|---|---|
| 2012/0098819 | A1* | 4/2012 | Furuya | B60K 35/81 |
| | | | | 345/212 |
| 2015/0021483 | A1* | 1/2015 | Murayama | G01B 11/026 |
| | | | | 359/199.1 |
| 2019/0285877 | A1* | 9/2019 | Ogino | G02B 26/101 |
| 2020/0077059 | A1 | 3/2020 | Senshiki | |
| 2020/0314395 | A1 | 10/2020 | Greif et al. | |
| 2021/0088929 | A1* | 3/2021 | Inagaki | G02B 26/127 |

FOREIGN PATENT DOCUMENTS

| | | | | |
|---|---|---|---|---|
| JP | 56-9763 | A | | 1/1981 |
| JP | 2004301973 | A * | 10/2004 | |
| JP | 2005-242036 | A | | 9/2005 |
| JP | 2009-180753 | A | | 8/2009 |
| JP | 2015049266 | A * | 3/2015 | ............. B60K 35/00 |
| JP | 2020-39082 | A | | 3/2020 |

OTHER PUBLICATIONS

Extended European Search Report for European Application No. 22176640.5, dated Nov. 8, 2022.

* cited by examiner

SHIFT OCCURS

SHIFT OCCURS

SHIFT OCCURS

IMAGE FORMING APPARATUS COMPRISING A MOVABLE MIRROR AND OPERATION METHOD THEREOF

CROSS-REFERENCE TO RELATED APPLICATIONS

The present application claims priority under 35 U.S.C. § 119 to Japanese Patent Application No. 2021-095860 filed on Jun. 8, 2021. The above application is hereby expressly incorporated by reference, in its entirety, into the present application.

BACKGROUND

1. Technical Field

The disclosed technology relates to an image forming apparatus and an operation method thereof.

2. Description of the Related Art

An image forming apparatus that draws an image on a screen or the like by irradiating a light scanning device configured with micro electro mechanical systems (MEMS) with light has been known. The light scanning device comprises a movable mirror that swings about two orthogonal axes. For example, the light scanning device performs Lissajous scanning of light of which an intensity is modulated in accordance with an input image. The movable mirror is resonantly driven by two sine waves having different frequencies. In the Lissajous scanning, the movable mirror is resonantly driven about the two axes. Thus, there is an advantage that a deflection angle is large, and a scanning range of the light can be increased.

In drawing the image by the light scanning device, it is necessary to accurately estimate the deflection angle in a case where the movable mirror is swinging, and irradiate the movable mirror with the light having a predetermined intensity in accordance with the estimated deflection angle. In a case where estimation accuracy of the deflection angle of the movable mirror is low, the image drawn by the light scanning device is distorted. For example, the image drawn by the light scanning device is distorted due to a shift in irradiation timing between an advancing path and a returning path of the swing of the movable mirror.

U.S. Pat. No. 8,559,086B discloses a configuration of providing a stress sensor in a light scanning device and estimating a deflection angle of a movable mirror based on a sensor signal of the stress sensor.

In addition, JP2020-39082A discloses a method of measuring a projection distance by projecting and capturing a measurement image and correcting a position of an image to be subjected to calibration by projecting a calibration image based on the measured projection distance.

SUMMARY

The deflection angle of the movable mirror can be estimated using a driving signal for driving the movable mirror or an angle sensor configured with a piezoelectric element, in addition to the stress sensor disclosed in U.S. Pat. No. 8,559,086B.

However, a time delay occurs in the driving signal or the sensor signal due to a noise or the like. Thus, it is difficult to accurately estimate the deflection angle of the movable mirror.

In addition, while performing the calibration of associating a position on an image displayed on a display surface with a position on a captured image by projecting the calibration image is disclosed in JP2020-39082A, a projection timing of a projection unit is not corrected.

An object of the disclosed technology is to provide an image forming apparatus and an operation method thereof that can suppress distortion of an image.

In order to accomplish the above object, an image forming apparatus according to an aspect of the present disclosure comprises a light emitting device that emits light, a movable mirror that reflects the light emitted from the light emitting device, a first actuator that causes the movable mirror to swing about a first axis, a first reference signal output portion that outputs a first reference signal by estimating a point in time when a deflection angle of the movable mirror about the first axis becomes equal to a first reference angle, a light emission controller that causes the light emitting device to emit the light based on the first reference signal output from the first reference signal output portion, an imaging apparatus that images the light reflected by the movable mirror, and a correction portion that corrects a timing of the first reference signal output by the first reference signal output portion based on imaging information acquired by the imaging apparatus.

It is preferable that the image forming apparatus further comprises a second actuator that causes the movable mirror to swing about a second axis, and a second reference signal output portion that outputs a second reference signal by estimating a point in time when a deflection angle of the movable mirror about the second axis becomes equal to a second reference angle, in which the correction portion corrects the timing of the first reference signal output by the first reference signal output portion and a timing of the second reference signal output by the second reference signal output portion based on the imaging information captured by the imaging apparatus.

It is preferable that the first reference angle is an angle at which the deflection angle of the movable mirror about the first axis becomes zero, and the second reference angle is an angle at which the deflection angle of the movable mirror about the second axis becomes zero.

It is preferable that the first reference angle is an angle at which the deflection angle of the movable mirror about the first axis is the maximum or minimum, and the second reference angle is an angle at which the deflection angle of the movable mirror about the second axis is the maximum or minimum.

It is preferable that the first reference signal output portion estimates the point in time when the deflection angle of the movable mirror about the first axis becomes equal to the first reference angle, based on a first driving signal provided to the first actuator, and the second reference signal output portion estimates the point in time when the deflection angle of the movable mirror about the second axis becomes equal to the second reference angle, based on a second driving signal provided to the second actuator.

It is preferable that the image forming apparatus further comprises an optical element that guides a part of the light to the imaging apparatus on an optical path of the light reflected by the movable mirror.

An operation method of an image forming apparatus according to another aspect of the present disclosure is an operation method of an image forming apparatus including a light emitting device that emits light, a movable mirror that reflects the light emitted from the light emitting device, a first actuator that causes the movable mirror to swing about a first axis, a first reference signal output portion that outputs a first reference signal by estimating a point in time when a deflection angle of the movable mirror about the first axis becomes equal to a first reference angle, a light emission controller that causes the light emitting device to emit the light based on the first reference signal output from the first reference signal output portion, and an imaging apparatus that images the light reflected by the movable mirror, the operation method comprising correcting a timing of the first reference signal output by the first reference signal output portion based on imaging information acquired by the imaging apparatus.

According to the disclosed technology, an image forming apparatus and an operation method thereof that can suppress distortion of an image can be provided.

BRIEF DESCRIPTION OF THE DRAWINGS

Exemplary embodiments according to the technique of the present disclosure will be described in detail based on the following figures, wherein:

FIG. 3A illustrates a first deflection angle, and FIG. 3B illustrates a second deflection angle, FIG. 11A illustrates an example of correcting the timing of the first reference signal, and FIG. 11B illustrates an example of correcting the timing of the second reference signal.

DETAILED DESCRIPTION

Hereinafter, an embodiment according to the disclosed technology will be described in detail with reference to the drawings. As an example, in the following embodiment, a form of applying the disclosed technology to an image forming apparatus that forms an image on a projection surface by scanning laser light using a Lissajous method will be described.

Figure 1:
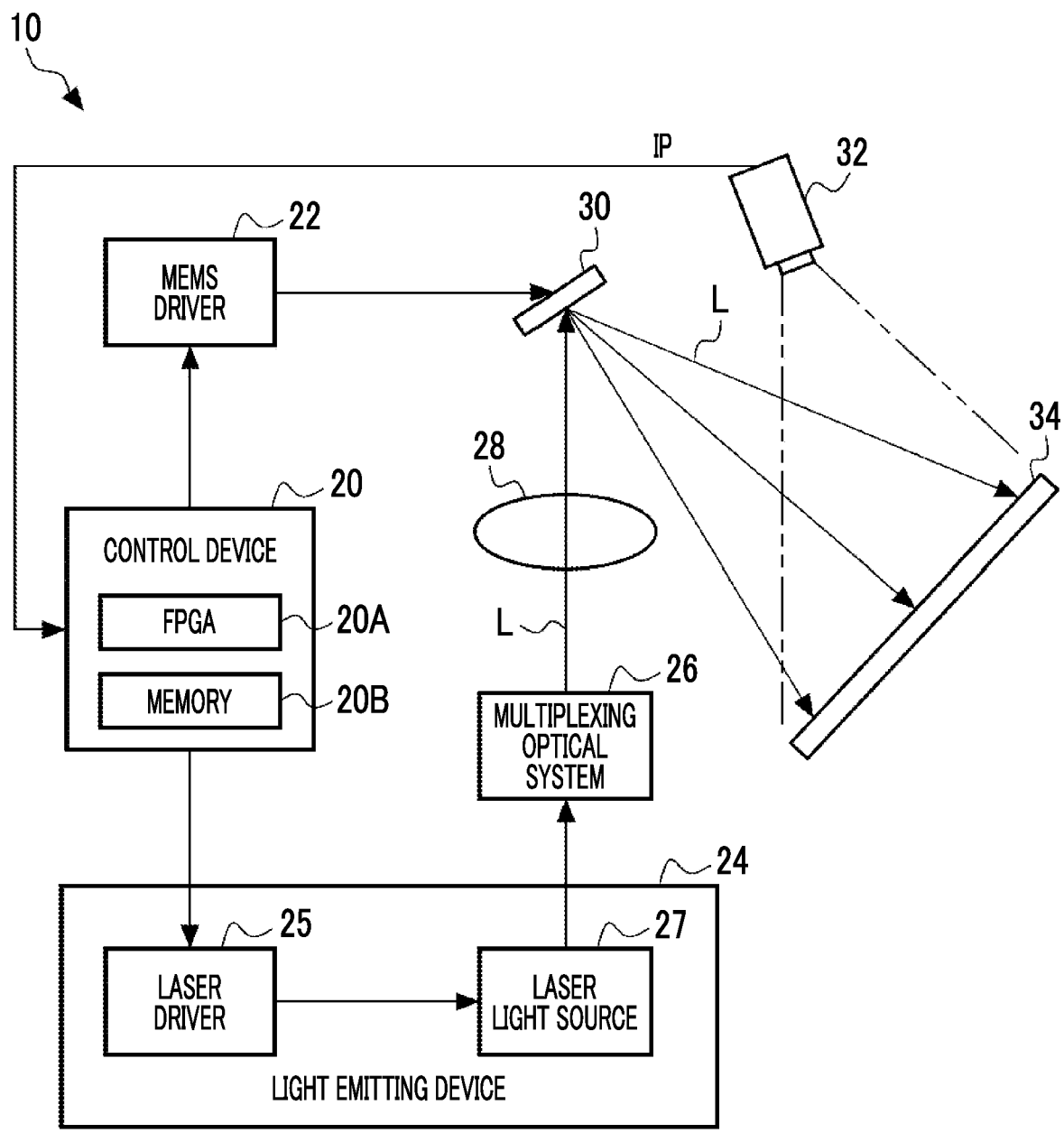
FIG. 1 is a schematic diagram illustrating an example of a configuration of an image forming apparatus.

FIG. 1 illustrates an example of a configuration of an image forming apparatus 10 of the present embodiment. As illustrated in FIG. 1, the image forming apparatus 10 of the present embodiment comprises a control device 20, a MEMS driver 22, a light emitting device 24, a multiplexing optical system 26, a collimator 28, a MEMS mirror 30, and an imaging apparatus 32. The MEMS mirror 30 is an example of a "light scanning device" according to the embodiment of the disclosed technology.

The light emitting device 24 includes a laser driver 25 and a laser light source 27. The laser driver 25 of the present embodiment drives the laser light source 27 based on an intensity modulation signal supplied from the control device 20 and causes laser light for forming an image to be output from the laser light source 27. For example, the laser light source 27 outputs the laser light of three colors of red (R), green (G), and blue (B). The laser light is an example of "light" according to the embodiment of the disclosed technology.

The laser light output from the laser light source 27 is multiplexed by the multiplexing optical system 26. Then, the MEMS mirror 30 is irradiated with the multiplexed laser light through the collimator 28. The laser light condensed in the MEMS mirror 30 is reflected toward a projection surface 34 by the MEMS mirror 30. For example, the projection surface 34 is a screen for projecting the image, or a retina of an eye of a person. That is, the image forming apparatus 10 of the present embodiment is used for a projector, augmented reality (AR) glasses, and the like.

In the present embodiment, the projection surface 34 is not limited to a surface of an actual object such as the screen and includes an imaginary plane in a space.

The MEMS driver 22 drives the MEMS mirror 30 under control of the control device 20. In the MEMS mirror 30, a mirror portion 40 (refer to FIG. 2) that reflects laser light L swings about each of two axes orthogonal to each other as a central axis. In the present embodiment, the laser light L is scanned in a state of drawing a Lissajous curve on the projection surface 34 by the swing of the mirror portion 40 based on a driving signal. The Lissajous curve is a curve that is decided by a swing frequency about a first axis, a swing frequency about a second axis, and a phase difference therebetween. The mirror portion 40 is an example of a "movable mirror" according to the embodiment of the disclosed technology.

The control device 20 of the present embodiment includes a field programmable gate array (FPGA) 20A and a memory 20B. For example, the memory 20B is a volatile memory and stores various information such as an image signal representing the image projected to the projection surface 34. For example, the memory 20B stores the image signal input from an outside of the image forming apparatus 10.

The imaging apparatus 32 generates a captured image IP by imaging the projection surface 34 irradiated with the laser light L by the MEMS mirror 30, and outputs the generated captured image IP to the control device 20. The imaging apparatus 32 is configured with an image sensor such as a charge coupled device (CCD) image sensor or a complementary metal oxide semiconductor (CMOS) image sensor. In addition, the imaging apparatus 32 may be configured with a position sensitive detector (PSD). The captured image IP is used for correcting timings of a first reference signal and a second reference signal, described later. The captured image IP is an example of "imaging information" according to the embodiment of the disclosed technology.

Figure 2:
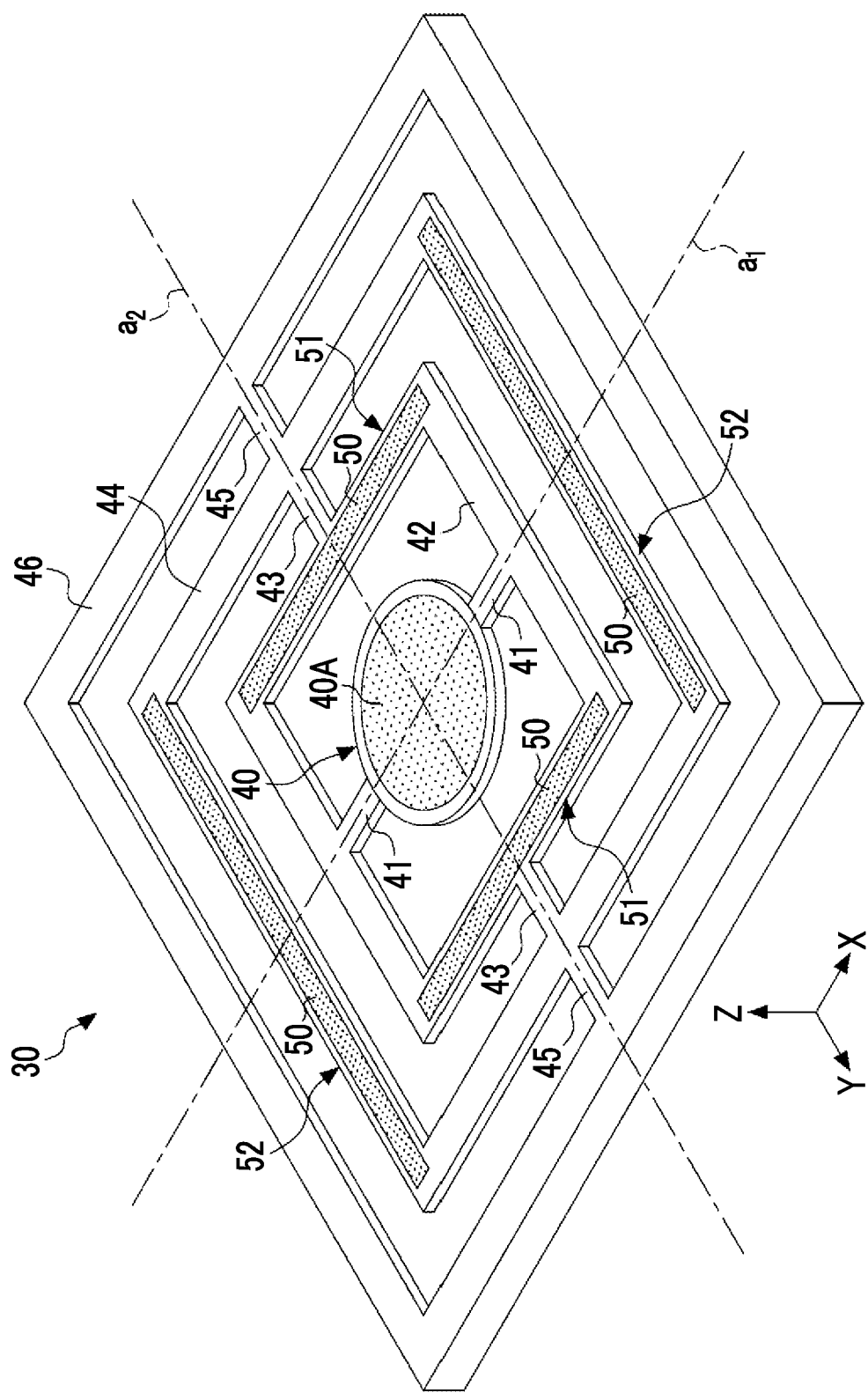
FIG. 2 is a schematic perspective view illustrating an example of a configuration of a MEMS mirror.

FIG. 2 illustrates an example of a configuration of the MEMS mirror 30. The MEMS mirror 30 includes the mirror portion 40, a first support portion 41, a first movable frame 42, a second support portion 43, a second movable frame 44, a connecting portion 45, and a fixed frame 46.

The mirror portion 40 has a reflecting surface 40A on which an incidence ray is reflected. For example, the reflecting surface 40A is formed with a thin metal film of gold (Au), aluminum (Al), silver (Ag), or a silver alloy. For example, a shape of the reflecting surface 40A is a circular shape.

The first support portion 41 is arranged outside the mirror portion 40 at each of positions that face with a second axis $a_2$ interposed therebetween. The first support portions 41 are connected to the mirror portion 40 on a first axis $a_1$ and support the mirror portion 40 in a swingable manner about the first axis $a_1$.

The first movable frame 42 is a rectangular frame surrounding the mirror portion 40 and is connected to the mirror portion 40 through the first support portions 41 on the first axis $a_1$. A piezoelectric element 50 is formed on the first movable frame 42 at each of positions that face with the first axis $a_1$ interposed therebetween. In such a manner, a pair of first actuators 51 are configured by forming two piezoelectric elements 50 on the first movable frame 42.

The pair of first actuators 51 are arranged at positions that face with the first axis $a_1$ interposed therebetween. The first actuators 51 cause the mirror portion 40 to swing about the first axis $a_1$ by applying rotational torque about the first axis $a_1$ to the mirror portion 40.

The second support portion 43 is arranged outside the first movable frame 42 at each of positions that face with the first axis $a_1$ interposed therebetween. The second support portions 43 are connected to the first movable frame 42 on the second axis $a_2$ and support the first movable frame 42 and the mirror portion 40 in a swingable manner about the second axis $a_2$. In the present embodiment, the second support portions 43 are torsion bars that stretch along the second axis az.

The second movable frame 44 is a rectangular frame surrounding the first movable frame 42 and is connected to the first movable frame 42 through the second support portions 43 on the second axis az. The piezoelectric element 50 is formed on the second movable frame 44 at each of positions that face with the second axis $a_2$ interposed therebetween. In such a manner, a pair of second actuators 52 are configured by forming two piezoelectric elements 50 on the second movable frame 44.

The pair of second actuators 52 are arranged at positions that face with the second axis $a_2$ interposed therebetween. The second actuators 52 cause the mirror portion 40 to swing about the second axis $a_2$ by applying rotational torque about the second axis $a_2$ to the mirror portion 40 and the first movable frame 42.

The connecting portion 45 is arranged outside the second movable frame 44 at each of positions that face with the first axis $a_1$ interposed therebetween. The connecting portions 45 are connected to the second movable frame 44 on the second axis az.

The fixed frame 46 is a rectangular frame surrounding the second movable frame 44 and is connected to the second movable frame 44 through the connecting portions 45 on the second axis az.

In the present embodiment, the first axis $a_1$ and the second axis $a_2$ are orthogonal to each other. In the following description, a direction parallel to the first axis $a_1$ will be referred to as an X direction, a direction parallel to the second axis $a_2$ will be referred to as a Y direction, and a direction orthogonal to the first axis $a_1$ and the second axis $a_2$ will be referred to as a Z direction.

Figure 3A:
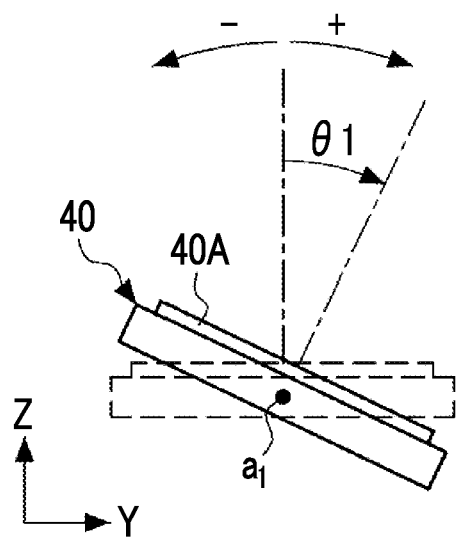
FIGS. 3A and 3B are diagrams for describing a deflection angle in a case where a mirror portion swings.
Figure 3B:
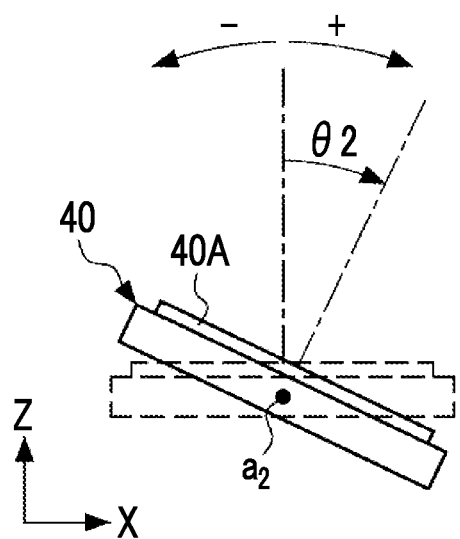

FIGS. 3A and 3B are diagrams for describing a deflection angle in a case where the mirror portion 40 swings. FIG. 3A illustrates a deflection angle (hereinafter, referred to as a first deflection angle) θ1 of the mirror portion 40 about the first axis $a_1$. FIG. 3B illustrates a deflection angle (hereinafter, referred to as a second deflection angle) θ2 of the mirror portion 40 about the second axis az.

The first deflection angle θ1 is an angle at which a line normal to the reflecting surface 40A is inclined with respect to the Z direction in a YZ plane. The second deflection angle θ2 is an angle at which the line normal to the reflecting surface 40A is inclined with respect to the Z direction in an XZ plane.

Figure 4:
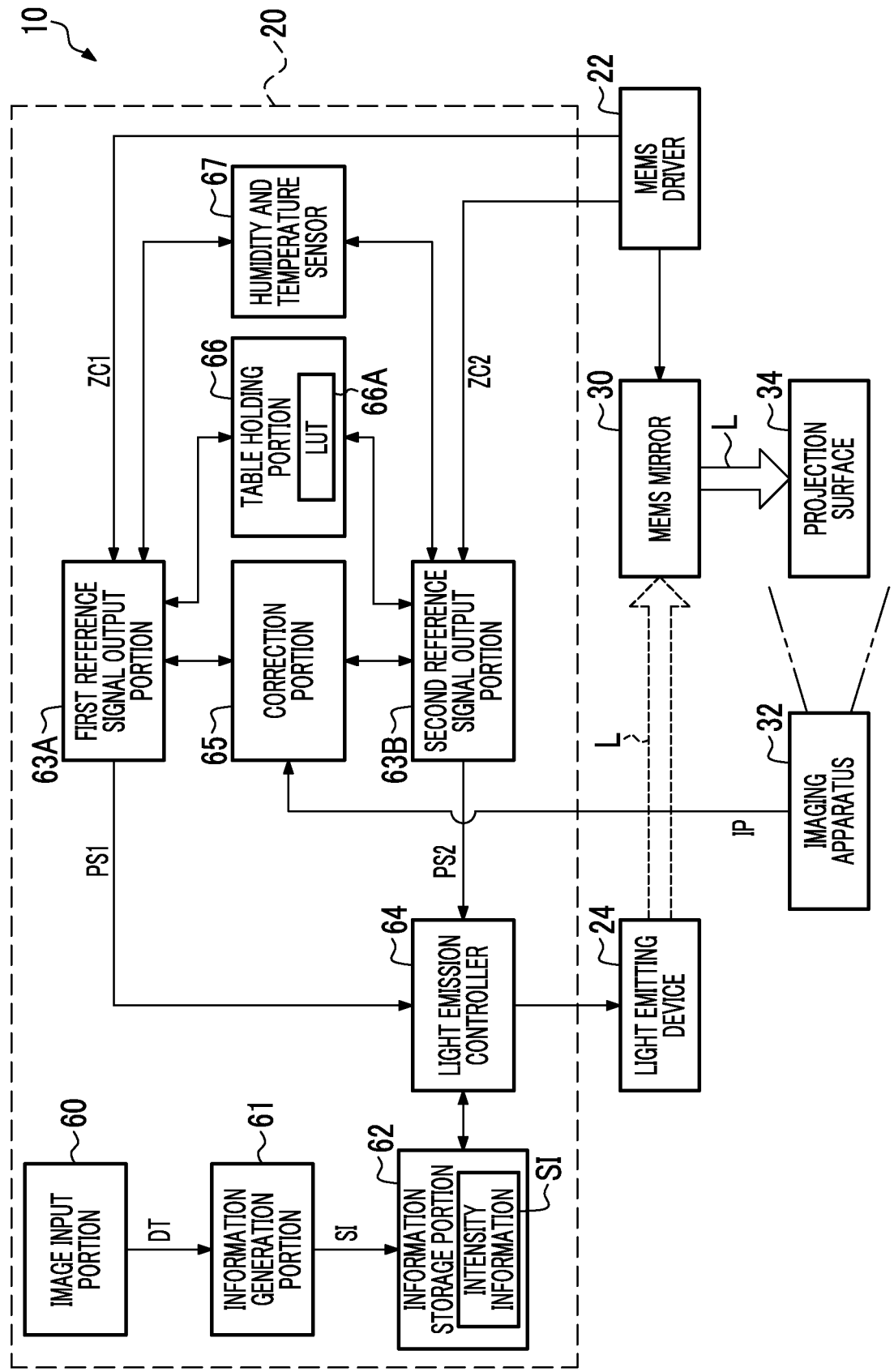
FIG. 4 is a block diagram illustrating an example of a functional configuration of a control device.

FIG. 4 illustrates an example of a functional configuration of the control device 20. As illustrated in FIG. 4, the control device 20 is configured with an image input portion 60, an information generation portion 61, an information storage portion 62, a first reference signal output portion 63A, a second reference signal output portion 63B, a light emission controller 64, a correction portion 65, a table holding portion 66, and a humidity and temperature sensor 67. The image input portion 60, the information generation portion 61, the information storage portion 62, the first reference signal output portion 63A, the second reference signal output portion 63B, the light emission controller 64, the correction portion 65, and the table holding portion 66 are functional portions implemented by causing the FPGA 20A and the memory 20B to operate in cooperation.

Image data DT that represents the image to be formed is input into the image input portion 60 from the outside. Hereinafter, the image corresponding to the image data DT input into the image input portion 60 may be referred to as an input image. As an example, in the present embodiment, the image data DT of colors represented by RGB signals is input into the image input portion 60. The image data DT input into the image input portion 60 is output to the information generation portion 61. The image data DT input into the image input portion 60 is not limited to the present embodiment and may be data corresponding to the image to be formed. For example, the image data DT may be binarized data that represents whether or not to output the laser light L. In addition, for example, the image data DT may be data that represents multiple values of an output amount.

The information generation portion 61 generates intensity information SI that represents a correspondence relationship between a scanning position of the laser light L by the MEMS mirror 30 and a signal intensity of the input image. In a case where the input image is a color image, the signal intensity represents an intensity of each of the RGB signals. The information storage portion 62 stores the intensity information SI generated by the information generation portion 61.

Figure 5:
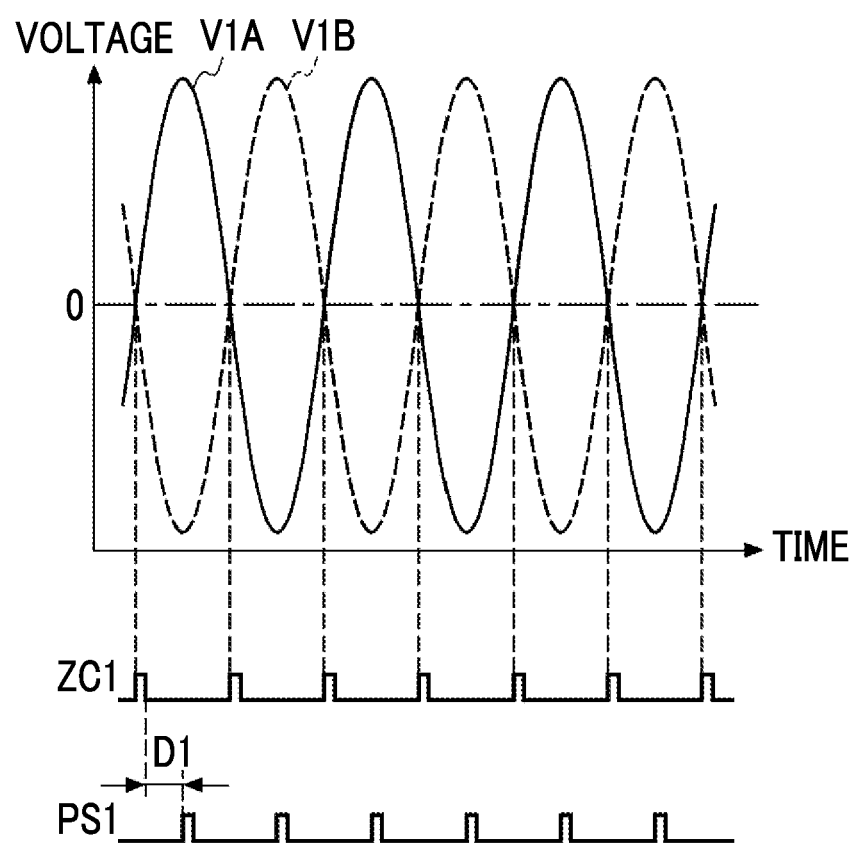
FIG. 5 is a diagram illustrating an example of a first driving signal, a first zero cross signal, and a first reference signal.

The MEMS driver 22 outputs first driving signals V1A and V1B illustrated in FIG. 5 as an example to the pair of first actuators 51 of the MEMS mirror 30, and generates a first zero cross signal ZC1 and outputs the first zero cross signal ZC1 to the first reference signal output portion 63A. The first driving signal V1A and the first driving signal V1B are sine waves having a phase difference of 180°.

The first zero cross signal ZC1 is a pulsed signal that represents points at which the first driving signals V1A and V1B become zero. Signals output to the first reference signal output portion 63A from the MEMS driver 22 are not limited to zero cross signals and may be signals having the same periods as the first driving signals V1A and V1B.

Figure 6:
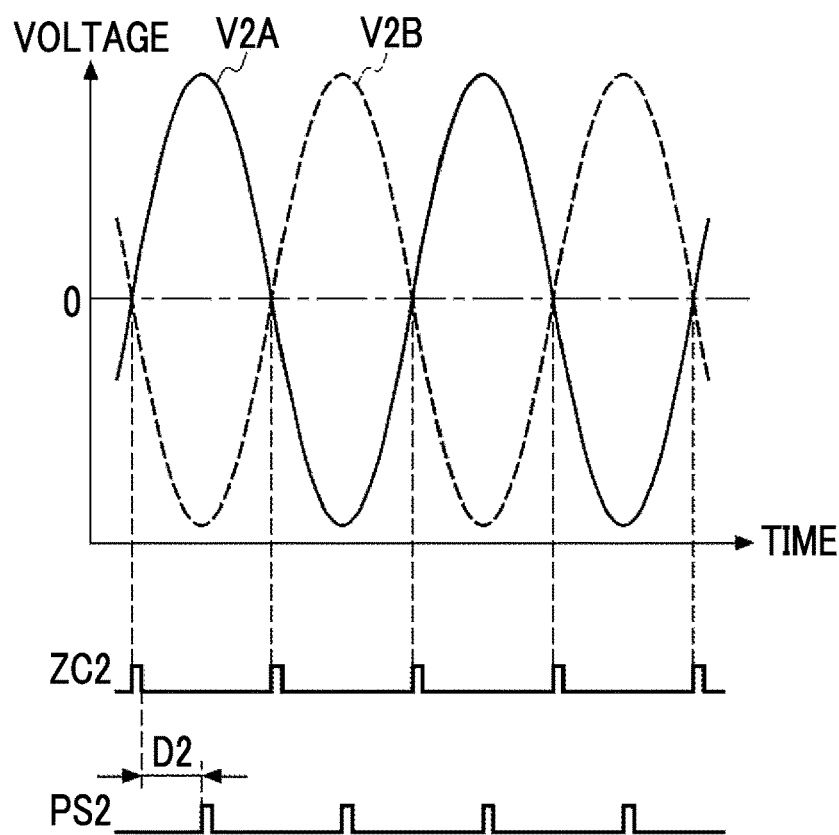
FIG. 6 is a diagram illustrating an example of a second driving signal, a second zero cross signal, and a second reference signal.

The MEMS driver 22 outputs second driving signals V2A and V2B illustrated in FIG. 6 as an example to the pair of second actuators 52 of the MEMS mirror 30, and generates a second zero cross signal ZC2 and outputs the second zero cross signal ZC2 to the second reference signal output portion 63B. The second driving signal V2A and the second driving signal V2B are sine waves having a phase difference of 180°.

The second zero cross signal ZC2 is a pulsed signal that represents points at which the second driving signals V2A and V2B become zero. Signals output to the second reference signal output portion 63B from the MEMS driver 22 are not limited to zero cross signals and may be signals having the same periods as the second driving signals V2A and V2B.

A frequency (hereinafter, referred to as a first driving frequency) of the first driving signals V1A and V1B and a frequency (hereinafter, referred to as a second driving frequency) of the second driving signals V2A and V2B have different frequency ratios. A frequency ratio of the first driving frequency and the second driving frequency is decided based on a shape of a Lissajous curve of light scanning performed by the MEMS mirror 30.

The first reference signal output portion 63A outputs a first reference signal PS1 to the light emission controller 64 by estimating a point in time when the first deflection angle $\theta 1$ of the mirror portion 40 becomes equal to a first reference angle. In the present embodiment, the first reference angle is set to 0°. The first reference signal output portion 63A generates the first reference signal PS1 by estimating the point in time when the first deflection angle $\theta 1$ becomes equal to the first reference angle, based on the first driving signals V1A and V1B.

Specifically, as illustrated in FIG. 5, the first reference signal output portion 63A outputs a signal obtained by delaying the first zero cross signal ZC1 input from the MEMS driver 22 by a delay time period D1 as the first reference signal PS1. In a case where the mirror portion 40 resonates about the first axis at, the delay time period D1 is ideally a time period corresponding to ¼ of a period of the first zero cross signal ZC1. However, a shift occurs due to an environmental condition (a temperature, a humidity, and the like). Thus, in the present embodiment, the first reference signal output portion 63A acquires the delay time period D1 based on a temperature and a humidity detected by the humidity and temperature sensor 67 and a look-up table (hereinafter, referred to as the LUT) 66A held in the table holding portion 66, and generates the first reference signal PS1 based on the acquired delay time period D1.

The second reference signal output portion 63B outputs a second reference signal PS2 to the light emission controller 64 by estimating a point in time when the second deflection angle $\theta 2$ of the mirror portion 40 becomes equal to a second reference angle. In the present embodiment, the second reference angle is set to 0°. The second reference signal output portion 63B generates the second reference signal PS2 by estimating the point in time when the second deflection angle $\theta 2$ becomes equal to the second reference angle, based on the second driving signals V2A and V2B.

Specifically, as illustrated in FIG. 6, the second reference signal output portion 63B outputs a signal obtained by delaying the second zero cross signal ZC2 input from the MEMS driver 22 by a delay time period D2 as the second reference signal PS2. In a case where the mirror portion 40 resonates about the second axis $a_2$, the delay time period D2 is ideally a time period corresponding to ¼ of a period of the second zero cross signal ZC2. However, a shift occurs due to an environmental condition (a temperature, a humidity, and the like). Thus, in the present embodiment, the second reference signal output portion 63B acquires the delay time period D2 based on the temperature and the humidity detected by the humidity and temperature sensor 67 and the LUT 66A held in the table holding portion 66, and generates the second reference signal PS2 based on the acquired delay time period D2.

Figure 7:
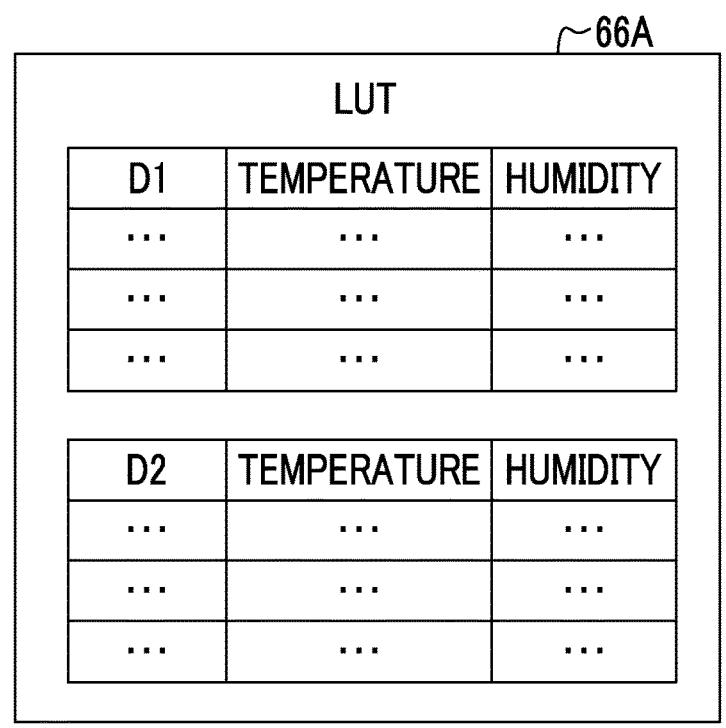
FIG. 7 is a diagram illustrating an example of an LUT.

As illustrated in FIG. 7 as an example, a relationship among the delay time period D1, the temperature, and the humidity and a relationship among the delay time period D2, the temperature, and the humidity are recorded in advance in the LUT 66A. For example, these relationships are decided based on a past history.

The light emission controller 64 causes the light emitting device 24 to emit the laser light L based on the first reference signal PS1 and the second reference signal PS2. In a drawing mode in which the image based on the image data DT is drawn on the projection surface 34, the light emission controller 64 reads out the intensity information SI from the information storage portion 62 and causes the light emitting device 24 to emit the laser light L having an intensity decided based on the first reference signal PS1 and the second reference signal PS2 for each constant time period (for example, for each clock period).

In addition, in the present embodiment, a calibration mode for correcting the timings of the first reference signal PS1 and the second reference signal PS2 output by the first reference signal output portion 63A and the second reference signal output portion 63B, respectively, is performed. In the calibration mode, the light emission controller 64 causes the light emitting device 24 to emit the laser light L in accordance with the timing at which the first reference signal PS1 is output from the first reference signal output portion 63A, and the timing at which the second reference signal PS2 is output from the second reference signal output portion 63B. That is, in the calibration mode, the light emission controller 64 causes the light emitting device 24 to emit the laser light L at the point in time when the first deflection angle $\theta 1$ is estimated to become equal to the first reference angle (in the present embodiment, 0°), and the point in time when the second deflection angle $\theta 2$ is estimated to become equal to the second reference angle (in the present embodiment, 0°).

In the calibration mode, the imaging apparatus 32 images a pattern that is drawn on the projection surface 34 by reflecting the laser light L emitted from the light emitting device 24 by the MEMS mirror 30. The imaging apparatus 32 outputs the captured image IP generated by imaging the projection surface 34 to the correction portion 65.

The correction portion 65 corrects the timings of the first reference signal PS1 and the second reference signal PS2 output by the first reference signal output portion 63A and the second reference signal output portion 63B, respectively, based on a shift amount of the pattern captured in the captured image IP from a predetermined shape.

Figure 8:
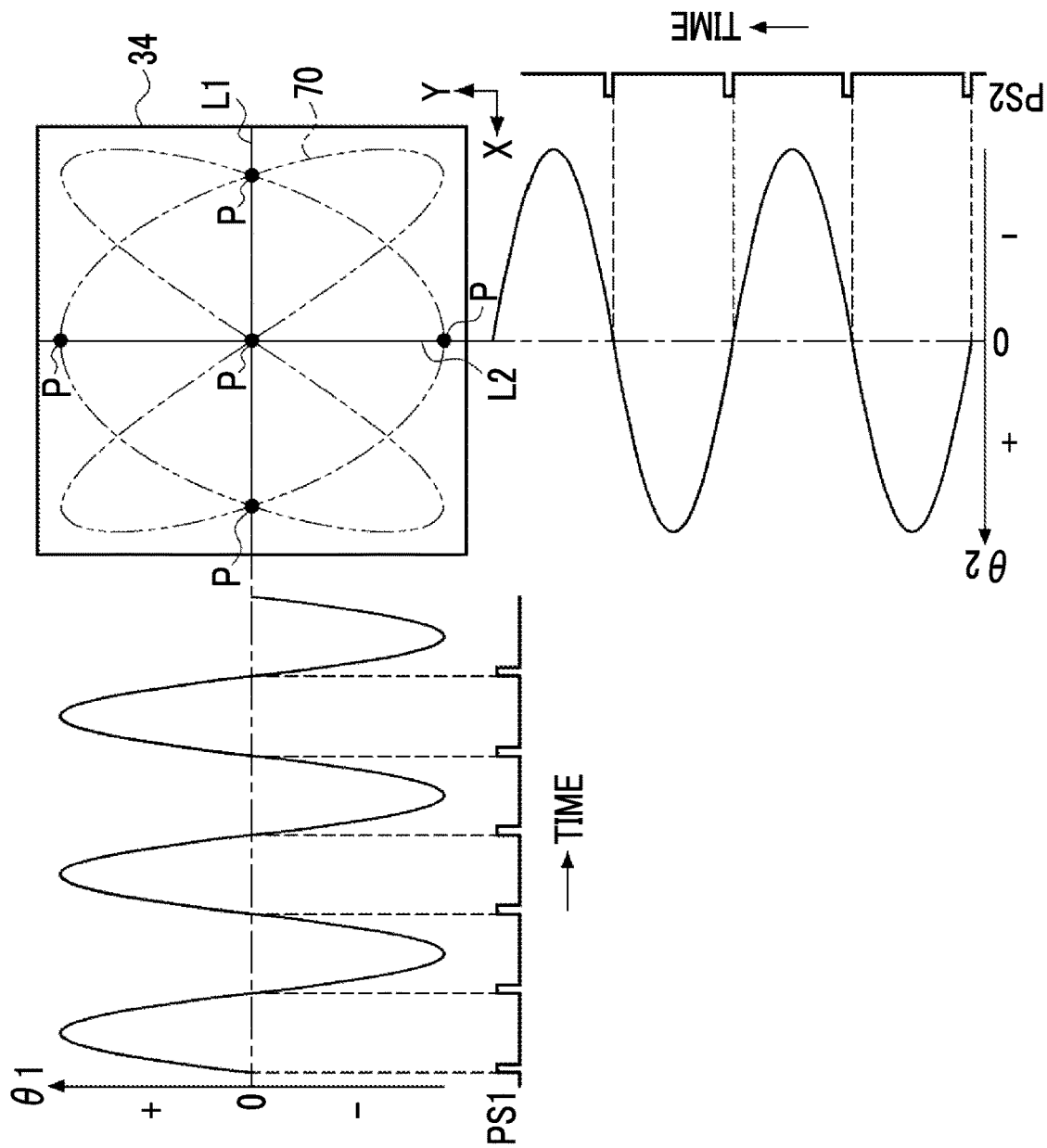
FIG. 8 is a diagram illustrating an example of a pattern drawn on a projection surface in a calibration mode.

FIG. 8 illustrates an example of the pattern drawn on the projection surface 34 in the calibration mode. In the present example, the frequency ratio of the first driving frequency and the second driving frequency is set to 3:2 for simplification of description. In the present example, a Lissajous curve 70 is drawn on the projection surface 34 by the light scanning performed by the MEMS mirror 30.

FIG. 8 illustrates a case where a shift does not occur between the swing of the mirror portion 40 and the timings of the first reference signal PS1 and the second reference signal PS2. In such a manner, in a case where a shift does not occur, the light emitting device 24 emits the laser light L at the point in time of $\theta1=0$ and the point in time of $\theta2=0$. Thus, a first reference line L1 and a second reference line L2 on the projection surface 34 are irradiated with the laser light L. In the present embodiment, the first reference line L1 is a straight line that passes through a center of the Lissajous curve 70 and is parallel to the X direction. The second reference line L2 is a straight line that passes through the center of the Lissajous curve 70 and is parallel to the Y direction. Reference numeral P denotes a point (that is, a bright point) irradiated with the laser light L on the projection surface 34.

In a case where the frequency ratio of the first driving frequency and the second driving frequency is set to make the Lissajous curve 70 more precise, the bright points P draw straight line patterns along the first reference line L1 and the second reference line L2.

Figure 9:
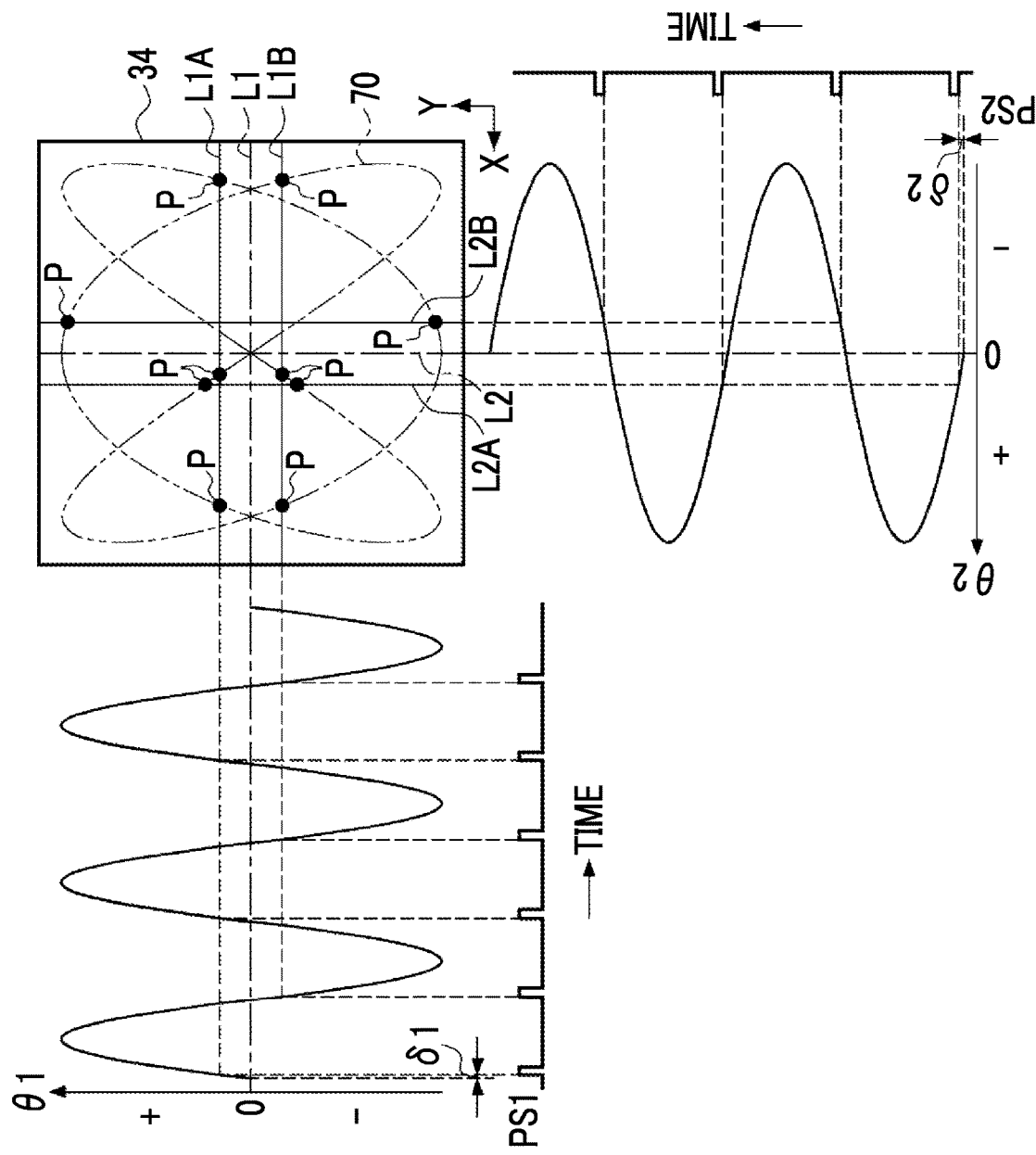
FIG. 9 is a diagram illustrating an example of the pattern drawn on the projection surface in a case where a shift occurs between a swing of the mirror portion and timings of the first reference signal and the second reference signal.

FIG. 9 illustrates a case where a shift occurs between the swing of the mirror portion 40 and the timings of the first reference signal PS1 and the second reference signal PS2. In such a manner, in a case where a shift occurs, the light emitting device 24 emits the laser light L at points in time shifted from the point in time of $\theta1=0$ and the point in time of $\theta2=0$. Thus, positions shifted from the first reference line L1 and the second reference line L2 on the projection surface 34 are irradiated with the laser light L. In the present example, straight lines L1A and L1B shifted from the first reference line L1 and straight lines L2A and L2B shifted from the second reference line L2 are irradiated with the laser light L.

The straight line L1A is a line that is irradiated with the laser light L on an advancing path of Lissajous scanning. The straight line L1B is a line that is irradiated with the laser light L on a returning path of the Lissajous scanning. In addition, the straight line L2A is a line that is irradiated with the laser light L on the advancing path of the Lissajous scanning. The straight line L2B is a line that is irradiated with the laser light L on the returning path of the Lissajous scanning. The advancing path refers to a path along which the first deflection angle $\theta1$ is increased for the Y direction, and a path along which the second deflection angle $\theta2$ is increased for the X direction. The returning path refers to a path along which the first deflection angle $\theta1$ is decreased for the Y direction, and a path along which the second deflection angle $\theta2$ is decreased for the X direction.

In such a manner, in a case where a shift occurs between the swing of the mirror portion 40 and the timings of the first reference signal PS1 and the second reference signal PS2, the first reference line L1 is separated into the straight line L1A and the straight line L1B, and the second reference line L2 is separated into the straight line L2A and the straight line L2B.

In a case where the frequency ratio of the first driving frequency and the second driving frequency is set to make the Lissajous curve 70 more precise, the bright points P draw straight line patterns along the straight line L1A, the straight line L1B, the straight line L2A, and the straight line L2B.

Figure 10:
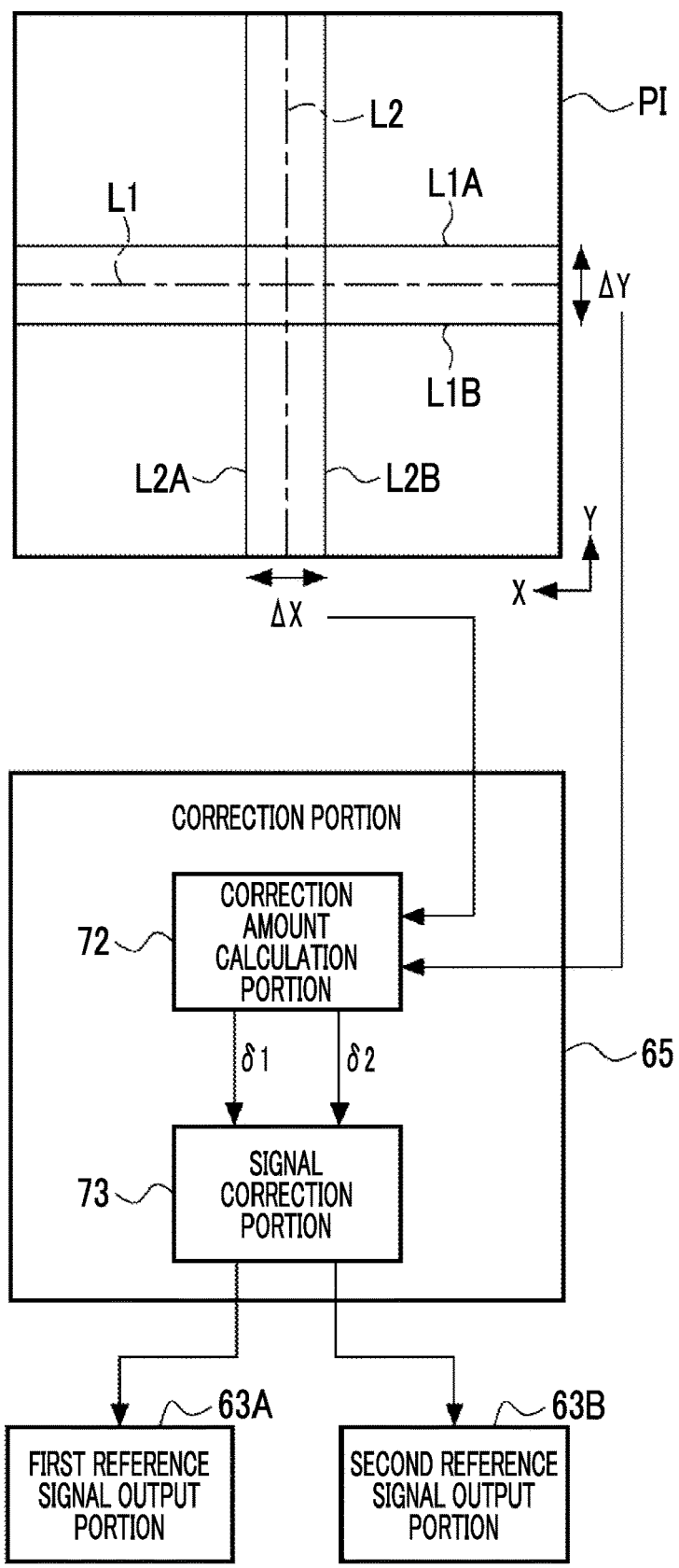
FIG. 10 is a diagram illustrating an example of a functional configuration of a correction portion.

FIG. 10 illustrates an example of a functional configuration of the correction portion 65. The correction portion 65 includes a correction amount calculation portion 72 and a signal correction portion 73. The captured image IP is input into the correction portion 65 from the imaging apparatus 32.

The correction amount calculation portion 72 derives a shift amount $\Delta Y$ between the straight line L1A and the straight line L1B in the Y direction and a shift amount $\Delta X$ between the straight line L2A and the straight line L2B in the X direction based on the captured image IP. In addition, the correction amount calculation portion 72 derives a correction amount $\delta1$ of the timing of the first reference signal PS1 for $\Delta X=0$ and a correction amount $\delta2$ of the timing of the second reference signal PS2 for $\Delta Y=0$ and outputs the derived correction amounts $\delta1$ and $\delta2$ to the signal correction portion 73. For example, the correction amount calculation portion 72 derives the correction amounts $\delta1$ and $\delta2$ based on a relationship between the shift amount $\Delta X$ and the correction amount $\delta1$ and a relationship between the shift amount $\Delta Y$ and the correction amount $\delta2$ stored in advance. Each of the relationship between the shift amount $\Delta X$ and the correction amount $\delta1$ and the relationship between the shift amount $\Delta Y$ and the correction amount $\delta2$ is an almost proportional relationship.

The correction amount calculation portion 72 derives the shift amounts $\Delta X$ and $\Delta Y$ based on the captured image IP obtained in a state where the timings of the first reference signal PS1 and the second reference signal PS2 are not corrected (that is, a state of $\delta1=0$ and $\delta2=0$), and derives the correction amounts $\delta1$ and $\delta2$ based on the derived shift amounts $\Delta X$ and $\Delta Y$.

The signal correction portion 73 corrects the timing of the first reference signal PS1 output from the first reference signal output portion 63A based on the correction amount $\delta1$ input from the correction amount calculation portion 72, and corrects the timing of the second reference signal PS2 output from the second reference signal output portion 63B based on the correction amount $\delta2$ input from the correction amount calculation portion 72.

Figure 11A:
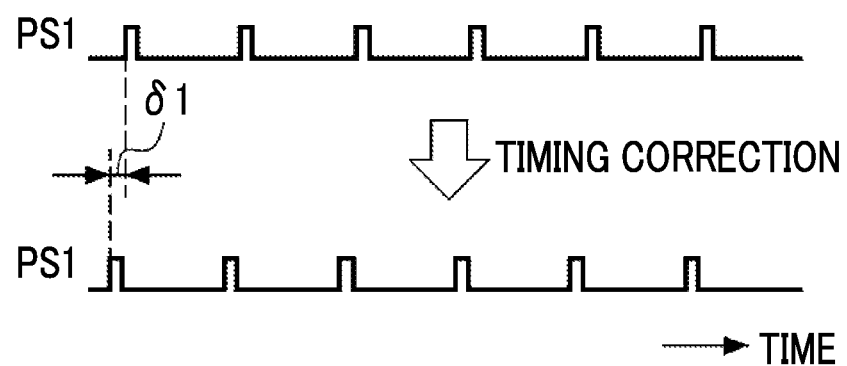
FIGS. 11A and 11B are diagrams illustrating an example of timing correction performed by a signal correction portion.
Figure 11B:
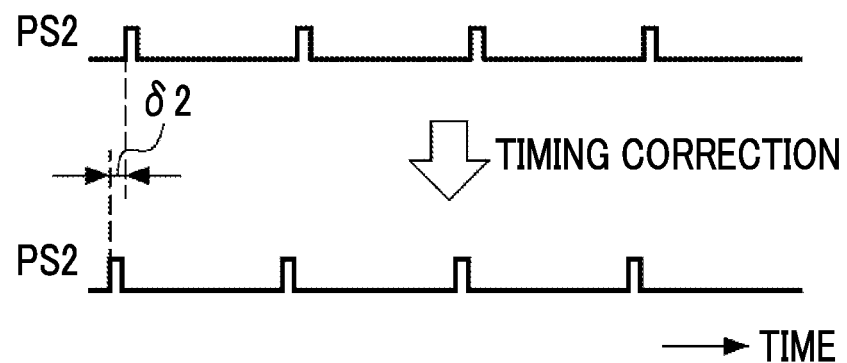

FIGS. 11A and 11B illustrate an example of timing correction performed by the signal correction portion 73. FIG. 11A illustrates an example of correcting the timing of the first reference signal PS1 based on the correction amount $\delta1$. FIG. 11B illustrates an example of correcting the timing of the second reference signal PS2 based on the correction amount $\delta2$. Correcting the timings of the first reference signal PS1 and the second reference signal PS2 results in $\Delta X=0$ and $\Delta Y=0$. Accordingly, the straight line L1A matches the straight line L1B, and the straight line L2A matches the straight line L2B.

The signal correction portion 73 may be provided inside each of the first reference signal output portion 63A and the second reference signal output portion 63B. In this case, the first reference signal output portion 63A corrects the timing of the first reference signal PS1 based on the correction amount $\delta1$ input from the correction amount calculation portion 72. Similarly, the second reference signal output portion 63B corrects the timing of the second reference signal PS2 based on the correction amount $\delta2$ input from the correction amount calculation portion 72.

For example, the calibration mode is executed for a predetermined period when the image forming apparatus 10 is started. After the calibration mode is finished, the first reference signal output portion 63A and the second reference signal output portion 63B continue the timing correction based on the correction amounts δ1 and δ2 in the drawing mode. The calibration mode may be periodically executed during execution of the drawing mode.

As described above, the image forming apparatus 10 can suppress distortion of the image drawn on the projection surface 34 by correcting the timings of the first reference signal PS1 and the second reference signal PS2 based on the imaging information acquired by the imaging apparatus 32.

Hereinafter, various modification examples of the embodiment will be described.

In the embodiment, while the first reference line L1 and the second reference line L2 are set to pass through the center of the Lissajous curve 70 as illustrated in FIG. 8, setting positions of the first reference line L1 and the second reference line L2 are not limited thereto and can be appropriately changed.

Figure 12:
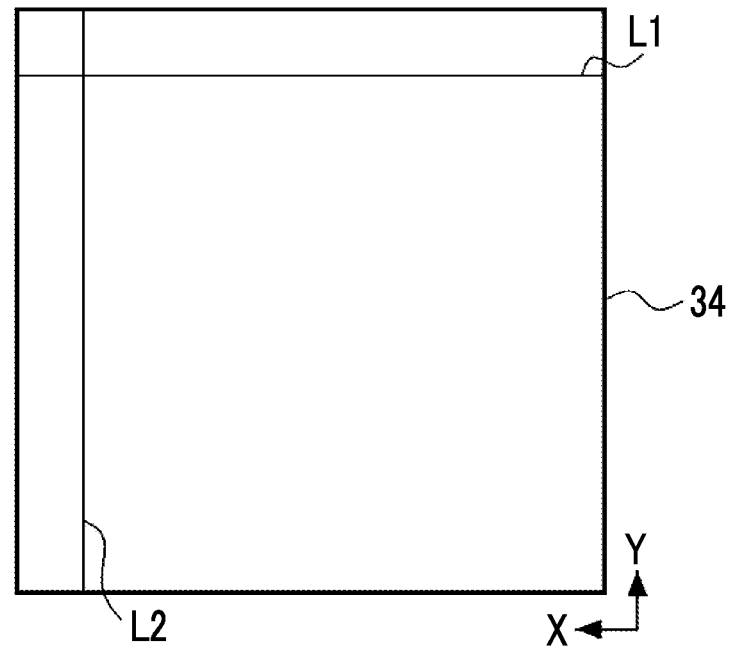
FIG. 12 is a diagram illustrating a first modification example related to position setting of a first reference line and a second reference line.
Figure 12:
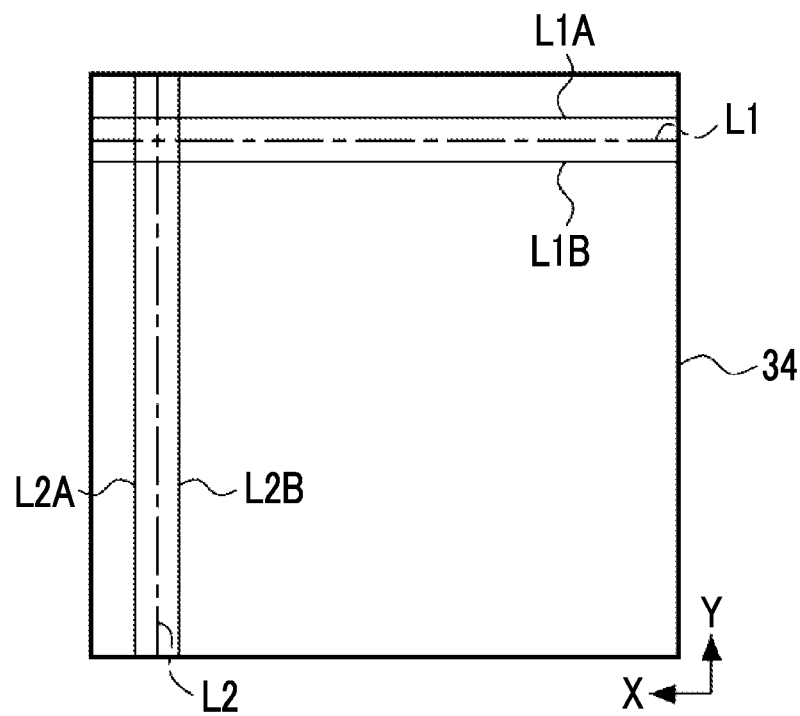

As illustrated in FIG. 12 as an example, the positions of the first reference line L1 and the second reference line L2 may be set in an end part of a drawing region of the laser light L. In the present example, in a case where a shift does not occur between the swing of the mirror portion 40 and the timings of the first reference signal PS1 and the second reference signal PS2, the first reference line L1 and the second reference line L2 are irradiated with the laser light L. On the other hand, in a case where a shift occurs, the straight lines L1A and L1B shifted from the first reference line L1 and the straight lines L2A and L2B shifted from the second reference line L2 are irradiated with the laser light L. The correction portion 65, in the same manner as the embodiment, corrects the timings of the first reference signal PS1 and the second reference signal PS2 so that the straight line L1A matches the straight line L1B, and the straight line L2A matches the straight line L2B.

In such a manner, in a case where the positions of the first reference line L1 and the second reference line L2 are set in the end part of the drawing region, a user is unlikely to recognize the first reference line L1 and the second reference line L2. Thus, it is possible to execute calibration without causing the user to feel awkward while displaying the image on the projection surface 34.

In addition, in the embodiment, in the calibration mode, the irradiation with the laser light L is performed on the advancing path and the returning path of the Lissajous scanning. Accordingly, in a case where a shift occurs as described above, the first reference line L1 is separated into the straight line L1A and the straight line L1B, and the second reference line L2 is separated into the straight line L2A and the straight line L2B. Instead, the irradiation with the laser light L may be performed on only one of the advancing path and the returning path of the Lissajous scanning.

Figure 13:
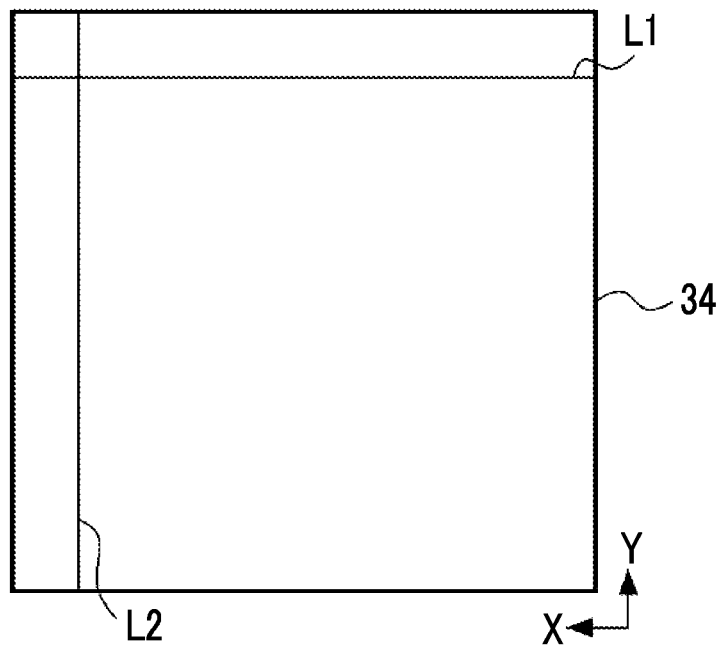
FIG. 13 is a diagram illustrating a second modification example related to the position setting of the first reference line and the second reference line.
Figure 13:
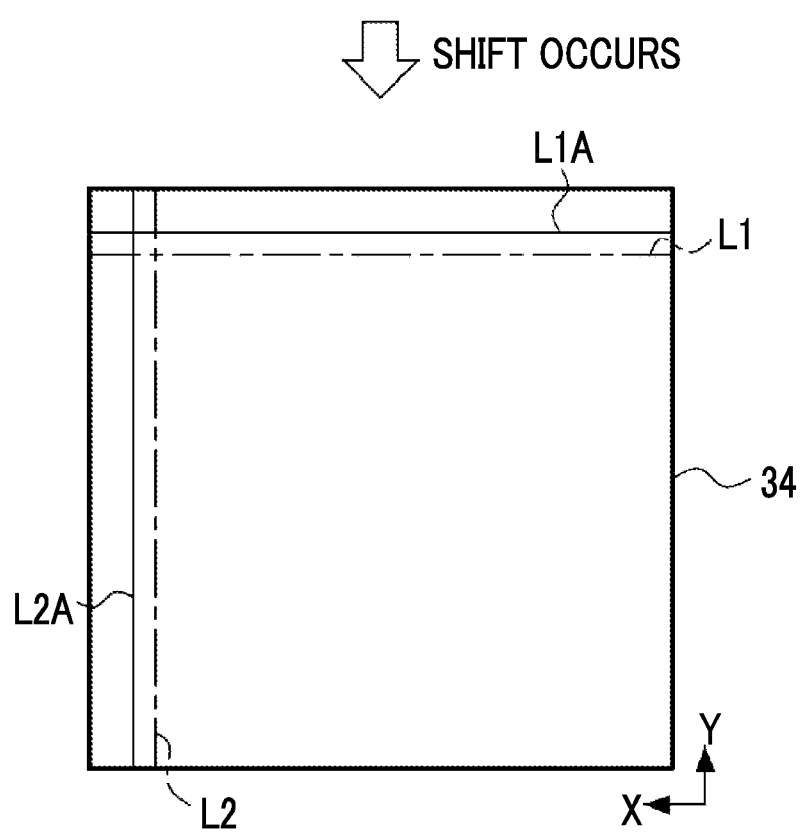

FIG. 13 illustrates an example of performing the irradiation with the laser light L on only the advancing path in a case where the positions of the first reference line L1 and the second reference line L2 are set in the end part of the drawing region of the laser light L. In the present example, in a case where a shift occurs between the swing of the mirror portion 40 and the timings of the first reference signal PS1 and the second reference signal PS2, the straight line L1A shifted from the first reference line L1 and the straight line L2A shifted from the second reference line L2 are irradiated with the laser light L. In the present example, the correction portion 65 may correct the timings of the first reference signal PS1 and the second reference signal PS2 so that the straight line L1A matches the first reference line L1, and the straight line L2A matches the second reference line L2.

In addition, in the embodiment, in the calibration mode, the irradiation with the laser light L is performed a plurality of times in one scanning period of the Lissajous scanning. One scanning period of the Lissajous scanning corresponds to a frame period of the image projected to the projection surface 34. In the calibration mode, the number of times the irradiation with the laser light L is performed in one scanning period of the Lissajous scanning may be once (that is, one pulse).

Figure 14:
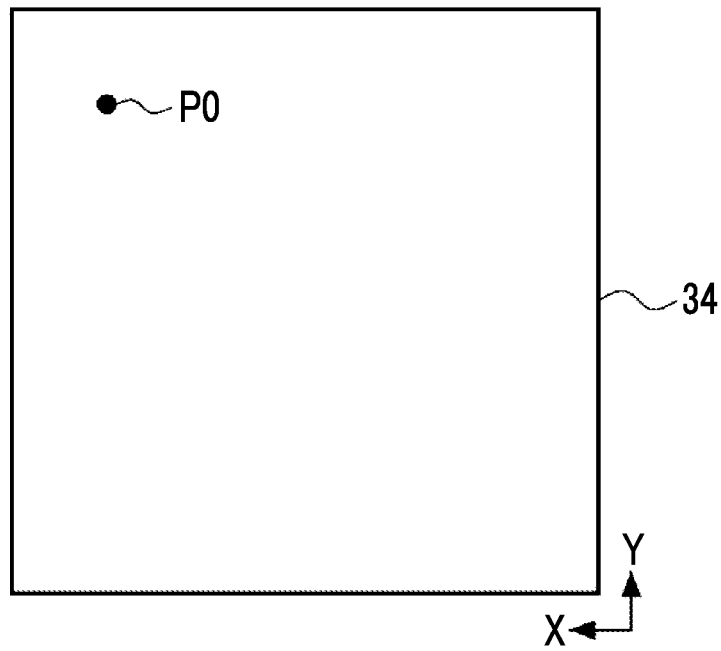
FIG. 14 is a diagram illustrating an example of performing irradiation with laser light only once in one scanning period of Lissajous scanning.
Figure 14:
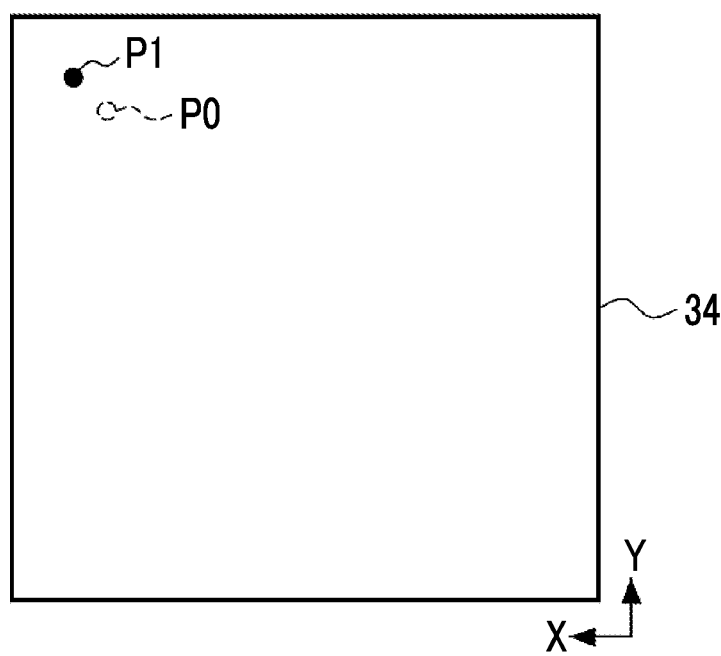

FIG. 14 illustrates an example of performing the irradiation with the laser light L only once in one scanning period of the Lissajous scanning. In the present example, in a case where a shift does not occur as described above, a reference point P0 is irradiated with the laser light L. On the other hand, in a case where a shift occurs as described above, a point P1 shifted from the reference point P0 is irradiated with the laser light L. In the present example, the correction portion 65 may correct the timings of the first reference signal PS1 and the second reference signal PS2 so that the point P1 matches the reference point P0.

In the example illustrated in FIG. 14, while the reference point P0 is set in the end part of the drawing region, the reference point P0 may be at a center position (that is, a position of $\theta 1=0$ and $\theta 2=0$) of the drawing region. In addition, the reference point P0 may be set as a point at which the Lissajous curve 70 intersects. In this case, it is also preferable that the irradiation with the laser light L is performed each time the Lissajous scanning passes through the reference point P0 (that is, the irradiation with the laser light L is performed twice in one scanning period of the Lissajous scanning). In this case, in a case where a shift occurs as described above, the reference point P0 is separated into two points. Thus, the correction portion 65 may correct the timings of the first reference signal PS1 and the second reference signal PS2 so that the two separated points match.

Figure 15:
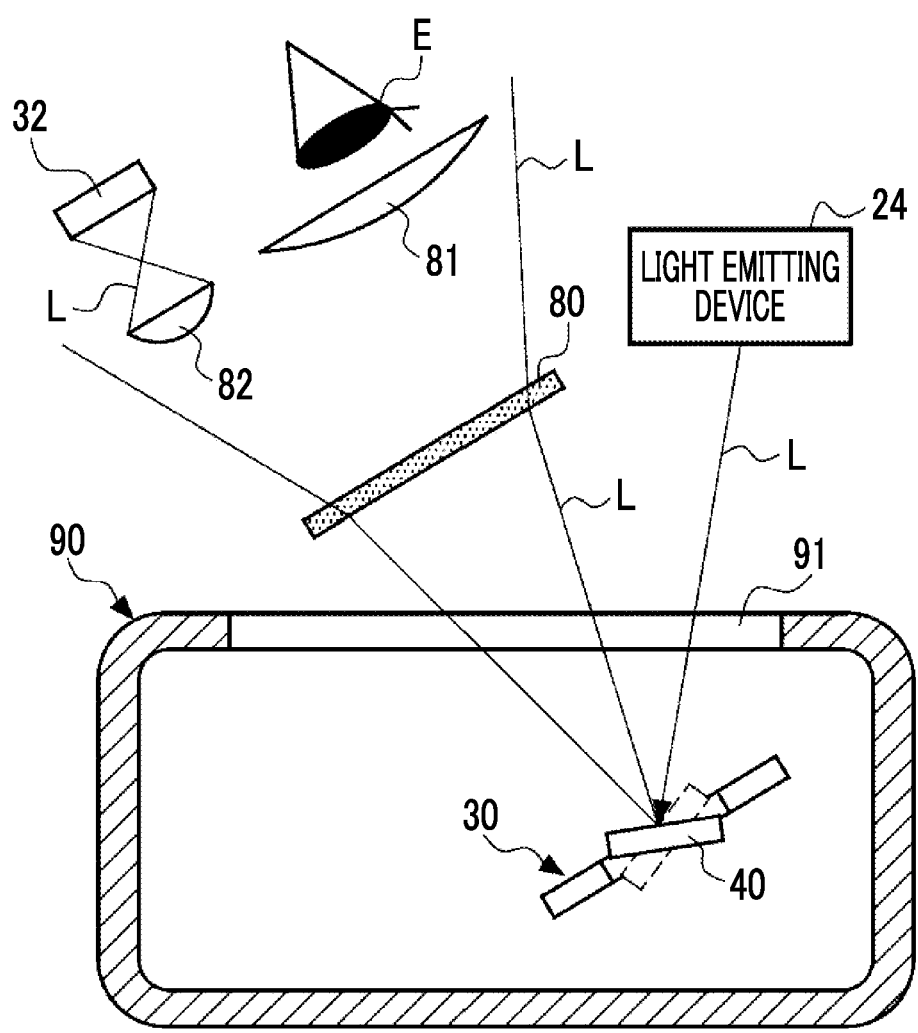
FIG. 15 is a diagram illustrating a first modification example of the image forming apparatus.

In the embodiment, while the projection surface 34 such as the screen is irradiated with the laser light L from the MEMS mirror 30, an eyeball or the like of a person may be irradiated with the laser light L from the MEMS mirror 30. In this case, as illustrated in FIG. 15 as an example, a first optical element 80 having a light diffusion function is provided on an optical path of the laser light L reflected by the MEMS mirror 30. The first optical element 80 has a function of expanding a so-called eye-box (a range in which a video can be viewed by moving eyes).

The laser light L emitted from the light emitting device 24 is incident on the MEMS mirror 30. The laser light L incident on the MEMS mirror 30 is emitted toward the first optical element 80 by modulating a reflection direction by the swinging mirror portion 40.

The first optical element 80 transmits and diffuses the laser light L incident from the MEMS mirror 30. For example, the first optical element 80 is a microlens array. The first optical element 80 is not limited to a microlens array and may be an optical element such as a frosted glass, a grating, or a hologram or may be a combination thereof.

A second optical element 81 for guiding the laser light L to an eyeball E is provided on the optical path of the laser light L transmitted through the first optical element 80.

In addition, a third optical element 82 for guiding a part of the laser light L to the imaging apparatus 32 is provided on the optical path of the laser light L transmitted through the first optical element 80. The third optical element 82 condenses the part of the laser light L transmitted through the first optical element 80 and forms an image of the condensed part of the laser light L on an imaging surface of the imaging apparatus 32. In the present example, since the laser light L is diffused by the first optical element 80, it is preferable to provide the third optical element 82 that condenses the laser light L. The third optical element 82 is an example of an "optical element that guides a part of light to an imaging apparatus" according to the embodiment of the disclosed technology.

For example, the second optical element 81 and the third optical element 82 are lenses formed of glass or resin. The second optical element 81 and the third optical element 82 are not limited to lenses and may be optical elements such as holograms or concave mirrors or may be a combination thereof. It is preferable to configure the third optical element 82 with a hologram from a viewpoint of size reduction compared to a case of configuring the third optical element 82 with a liquid crystal or the like.

In addition, for example, the MEMS mirror 30 is accommodated in a package 90. An inside of the package 90 is depressurized or is in a vacuum in order to decrease air resistance of the swinging mirror portion 40. For example, the package 90 is formed of glass. At least a part of the package 90 has light transmittance. The laser light L emitted from the light emitting device 24 is incident on the MEMS mirror 30 through a light transmission portion 91 of the package 90, and the laser light L reflected by the mirror portion 40 is emitted to the outside through the light transmission portion 91.

Figure 16:
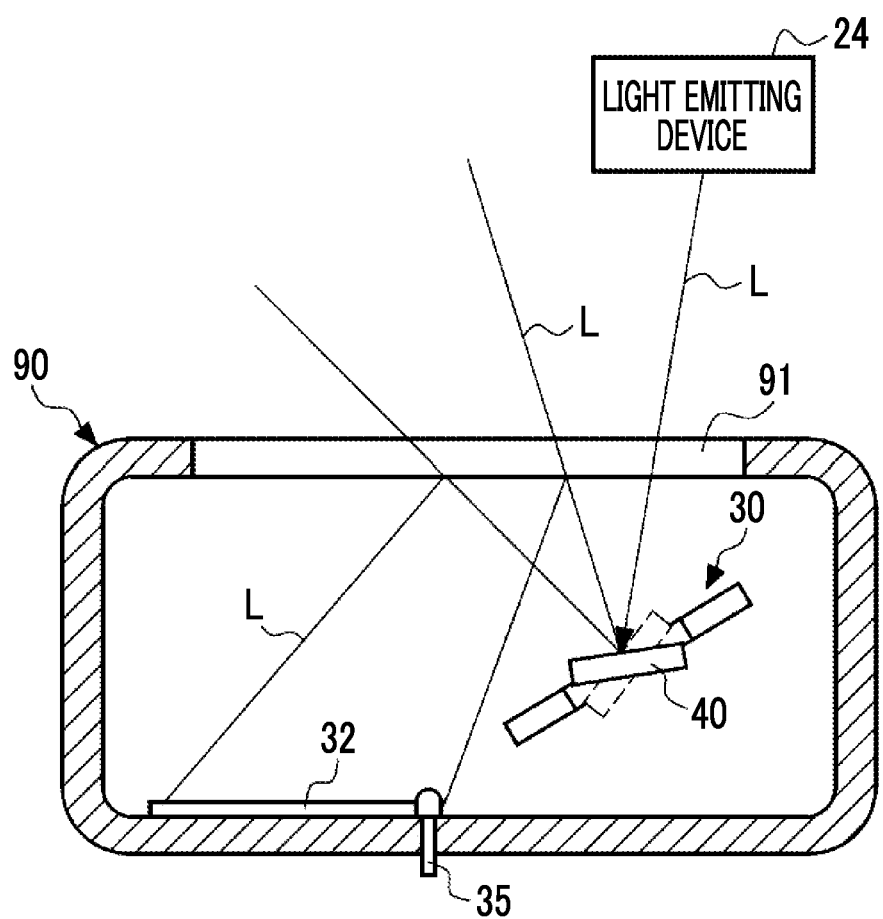
FIG. 16 is a diagram illustrating a second modification example of the image forming apparatus.

In addition, as illustrated in FIG. 16 as an example, the imaging apparatus 32 may be provided inside the package 90. In FIG. 16, the imaging apparatus 32 is provided on the optical path of the laser light L reflected on a surface of the light transmission portion 91 out of the laser light L reflected by the mirror portion 40. In this case, the imaging apparatus 32 receives the laser light L before the laser light L is diffused. Thus, it is not necessary to provide an optical element (the third optical element 82 illustrated in FIG. 15) for condensing the laser light L. The captured image IP generated by performing an imaging operation by the imaging apparatus 32 is output to the outside through a lead terminal 35. In such a manner, size reduction of the image forming apparatus 10 can be achieved by accommodating the imaging apparatus 32 inside the package 90. In the present example, the light transmission portion 91 is an example of the "optical element that guides the part of the light to the imaging apparatus" according to the embodiment of the disclosed technology.

Figure 17:
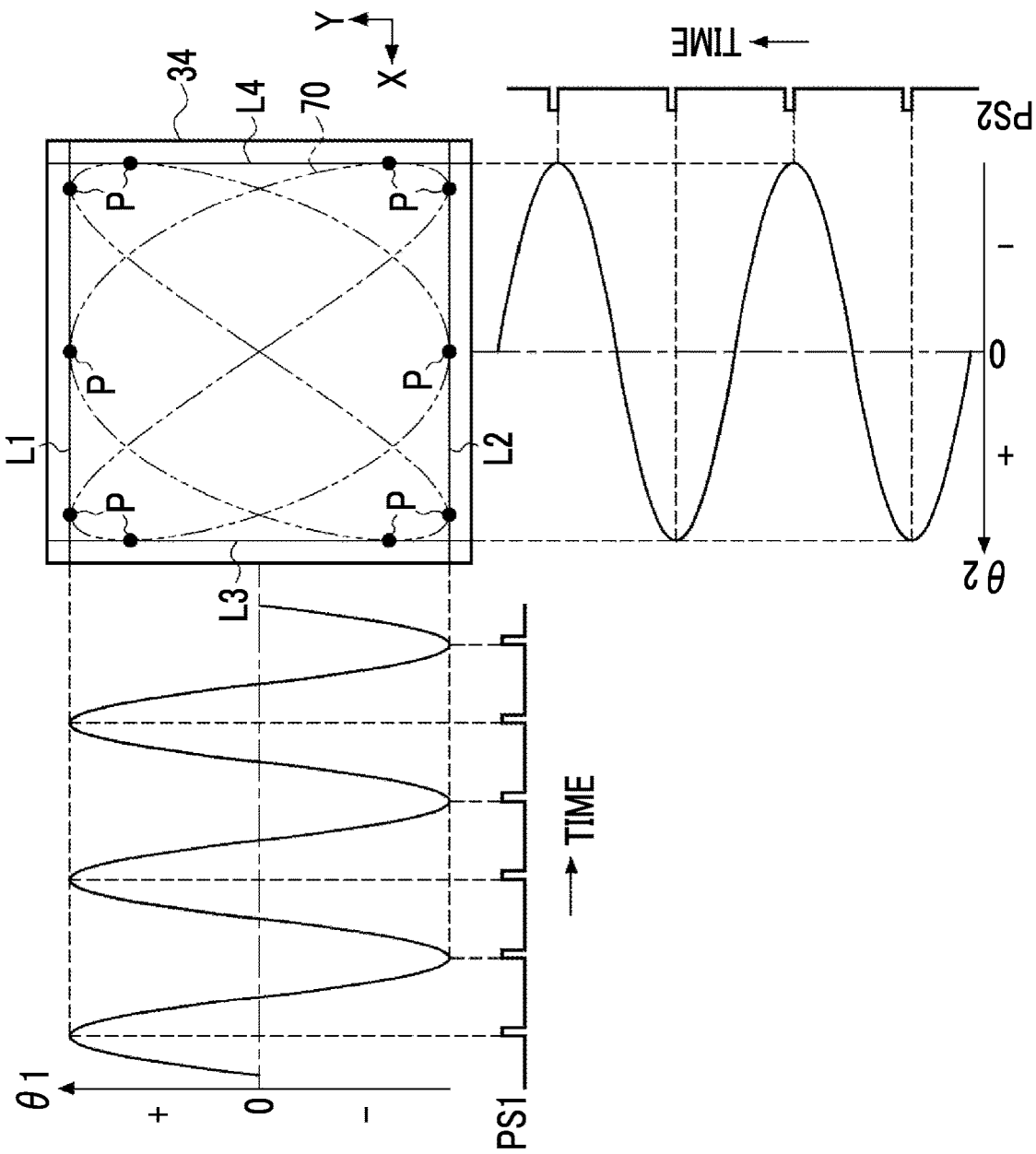
FIG. 17 is a diagram illustrating an example of setting a first reference angle as an angle at which the first deflection angle is the maximum or minimum, and setting a second reference angle as an angle at which the second deflection angle is the maximum or minimum.

In addition, in the embodiment, while both of the first reference angle and the second reference angle are set to 0°, the first reference angle and the second reference angle may be angles other than 0°. The first reference angle may be set as an angle at which the first deflection angle $\theta 1$ is the maximum or minimum, and the second reference angle may be set as an angle at which the second deflection angle $\theta 2$ is the maximum or minimum. In this case, as illustrated in FIG. 17 as an example, four reference lines L1 to L4 are irradiated with the laser light L on the projection surface 34. The reference lines L1 to L4 are straight lines tangential to an outer shape of the Lissajous curve 70. In a case where a shift occurs between the swing of the mirror portion 40 and the timings of the first reference signal PS1 and the second reference signal PS2, the bright points P of the laser light L are displaced inward from the reference lines L1 to L4. The correction portion 65 may correct the timings of the first reference signal PS1 and the second reference signal PS2 based on displacement amounts of the bright points P from the reference lines L1 to L4 that are derived using the captured image IP.

In addition, in the embodiment, the first reference signal output portion 63A outputs the first reference signal PS1 by estimating the point in time when the first deflection angle $\theta 1$ becomes equal to the first reference angle, using the temperature and the humidity detected by the humidity and temperature sensor 67 and the LUT 66A. Instead, the first reference signal output portion 63A may output the first reference signal PS1 by estimating the point in time when the first deflection angle $\theta 1$ becomes equal to the first reference angle, based on an angle sensor (not illustrated) that detects the first deflection angle $\theta 1$. Similarly, the second reference signal output portion 63B may output the second reference signal PS2 by estimating the point in time when the second deflection angle $\theta 2$ becomes equal to the second reference angle, based on an angle sensor (not illustrated) that detects the second deflection angle $\theta 2$.

In addition, in the embodiment, while the MEMS mirror 30 of two axes is used as the light scanning device, a MEMS mirror of one axis may be used as the light scanning device. Accordingly, the disclosed technology can also be applied to an image forming apparatus comprising a light scanning device of one axis in which a movable mirror swings about a first axis.

The embodiment and each modification example can be appropriately combined without contradiction.

In the embodiment, for example, the following various processors can be used as a hardware structure of a processing unit that executes various processing of the image input portion 60, the information generation portion 61, the information storage portion 62, the first reference signal output portion 63A, the second reference signal output portion 63B, the light emission controller 64, the correction portion 65, and the table holding portion 66. The various processors include, in addition to a central processing unit (CPU) that is a general-purpose processor functioning as various processing units by executing software (program), a programmable logic device (PLD) such as the FPGA that is a processor having a circuit configuration changeable after manufacturing, a dedicated electric circuit such as an application specific integrated circuit (ASIC) that is a processor having a circuit configuration dedicatedly designed to execute specific processing, and the like.

One processing unit may be configured with one of the various processors or may be configured with a combination of two or more processors of the same type or different types (for example, a combination of a plurality of FPGAs and/or a combination of a CPU and an FPGA). In addition, a plurality of processing units may be configured with one processor.

Examples of the plurality of processing units configured with one processor include, first, as represented by a computer such as a client and a server, a form in which one processor is configured with a combination of one or more CPUs and software, and the processor functions as the plurality of processing units. Second, as represented by a system on chip (SoC) or the like, a form of using a processor that implements functions of the entire system including the plurality of processing units by one integrated circuit (IC) chip is included. In such a manner, various processing units are configured using one or more of the various processors as a hardware structure.

Furthermore, more specifically, an electric circuit (circuitry) in which circuit elements such as semiconductor elements are combined can be used as the hardware structure of the various processors.

All documents, patent applications, and technical standards disclosed in the present specification are incorporated in the present specification by reference to the same extent as in a case where each of the documents, patent applications, technical standards are specifically and individually indicated to be incorporated by reference.

What is claimed is:

1. An image forming apparatus comprising:
    a light emitting device that emits light;
    a movable mirror that reflects the light emitted from the light emitting device;
    a first actuator that causes the movable mirror to swing about a first axis;
    a first reference signal output portion that outputs a first reference signal by estimating a point in time when a deflection angle of the movable mirror about the first axis becomes equal to a first reference angle;
    a light emission controller that causes the light emitting device to emit the light based on the first reference signal output from the first reference signal output portion;
    an imaging apparatus that images the light reflected by the movable mirror;
    a correction portion that corrects a timing of the first reference signal output by the first reference signal output portion based on imaging information acquired by the imaging apparatus;
    a second actuator that causes the movable mirror to swing about a second axis; and
    a second reference signal output portion that outputs a second reference signal by estimating a point in time when a deflection angle of the movable mirror about the second axis becomes equal to a second reference angle,
    wherein the correction portion corrects the timing of the first reference signal output by the first reference signal output portion and a timing of the second reference signal output by the second reference signal output portion based on the imaging information captured by the imaging apparatus.

2. The image forming apparatus according to claim 1, wherein the first reference angle is an angle at which the deflection angle of the movable mirror about the first axis becomes zero, and the second reference angle is an angle at which the deflection angle of the movable mirror about the second axis becomes zero.

3. The image forming apparatus according to claim 1, wherein the first reference angle is an angle at which the deflection angle of the movable mirror about the first axis is the maximum or minimum, and the second reference angle is an angle at which the deflection angle of the movable mirror about the second axis is the maximum or minimum.

4. The image forming apparatus according to claim 1, wherein the first reference signal output portion estimates the point in time when the deflection angle of the movable mirror about the first axis becomes equal to the first reference angle, based on a first driving signal provided to the first actuator, and
    the second reference signal output portion estimates the point in time when the deflection angle of the movable mirror about the second axis becomes equal to the second reference angle, based on a second driving signal provided to the second actuator.

5. The image forming apparatus according to claim 1, further comprising:
    an optical element that guides a part of the light to the imaging apparatus on an optical path of the light reflected by the movable mirror.

6. An operation method of an image forming apparatus including a light emitting device that emits light, a movable mirror that reflects the light emitted from the light emitting device, a first actuator that causes the movable mirror to swing about a first axis, a first reference signal output portion that outputs a first reference signal by estimating a point in time when a deflection angle of the movable mirror about the first axis becomes equal to a first reference angle, a light emission controller that causes the light emitting device to emit the light based on the first reference signal output from the first reference signal output portion, and an imaging apparatus that images the light reflected by the movable mirror, the operation method comprising:
    correcting a timing of the first reference signal output by the first reference signal output portion based on imaging information acquired by the imaging apparatus;
    wherein a second actuator causes the movable mirror to swing about a second axis,
    wherein a second reference signal output portion outputs a second reference signal by estimating a point in time when a deflection angle of the movable mirror about the second axis becomes equal to a second reference angle, and
    wherein the correcting corrects the timing of the first reference signal output by the first reference signal output portion and a timing of the second reference signal output by the second reference signal output portion based on the imaging information captured by the imaging apparatus.

* * * * *